(12) United States Patent
Wilmarth

(10) Patent No.: US 7,229,082 B1
(45) Date of Patent: Jun. 12, 2007

(54) WHEELED GOLF BAG CARRIER

(76) Inventor: Ralph H Wilmarth, 132 Birchwood Rd., Coram, NY (US) 11727

( * ) Notice: Subject to any disclaimer, the term of this patent is extended or adjusted under 35 U.S.C. 154(b) by 0 days.

(21) Appl. No.: 11/490,211

(22) Filed: Jul. 19, 2006

Related U.S. Application Data

(60) Provisional application No. 60/701,203, filed on Jul. 21, 2005.

(51) Int. Cl.
*B62B 1/00* (2006.01)

(52) U.S. Cl. .............. 280/47.26; 280/DIG. 6; 248/96

(58) Field of Classification Search .............. 280/79.5, 280/79.7, 47.25, 47.26, 79.2, 47.33, DIG. 6, 280/47.17, 47.18, 47.24, 47.131; 248/96
See application file for complete search history.

(56) References Cited

U.S. PATENT DOCUMENTS

| | | | |
|---|---|---|---|
| 5,924,709 A | 7/1999 | Yang | |
| 6,027,128 A * | 2/2000 | Stich et al. | 280/47.16 |
| 6,050,592 A | 4/2000 | Kim | |
| 6,056,301 A | 5/2000 | Berliner et al. | |
| 6,068,270 A | 5/2000 | Kim | |
| 6,068,271 A | 5/2000 | Lustica | |
| 6,079,718 A | 6/2000 | Liao | |
| 6,186,520 B1 | 2/2001 | Barten | |
| 6,299,183 B1 * | 10/2001 | Kaneko | 280/47.26 |
| 6,439,585 B1 * | 8/2002 | Tan | 280/47.26 |
| 6,513,816 B1 * | 2/2003 | Kijima | 280/47.26 |
| 6,598,889 B1 * | 7/2003 | Su | 280/47.26 |
| 6,659,477 B2 | 12/2003 | Jung | |
| D487,543 S * | 3/2004 | Chang | D3/255 |
| D491,726 S | 6/2004 | Ortega | |
| 6,783,147 B1 * | 8/2004 | Green, Sr. | 280/652 |
| 6,802,515 B2 | 10/2004 | Sorenson et al. | |
| 6,808,186 B1 * | 10/2004 | Su | 280/47.26 |
| 2002/0074754 A1 * | 6/2002 | Tan | 280/47.26 |

* cited by examiner

*Primary Examiner*—J. Allen Shriver
(74) *Attorney, Agent, or Firm*—Michael I Kroll

(57) ABSTRACT

A hand operated conveyance for a golf bag comprising mating halves of a carrier having wheels on one portion of the carrier and a leg on the other portion with a tongue and slot platform positioned therebetween and a strap for securing the halves in an operative state. The mating halves of the carrier are slidably engaged forming a platform for a golf bag that is placed thereon whereupon an adjustable strap peripherally positioned on the carrier and held to each halve by threading through an eyelet and the strap having a clasp which is secured thereby releasably securing the carrier to the base of the golf bag. The interlocking pieces using a tongue and slot mating also have rails and tracks formed in the mating pieces for added stability.

1 Claim, 8 Drawing Sheets

US 7,229,082 B1

WHEELED GOLF BAG CARRIER

RELATED APPLICATIONS

This application is subject to U.S. provisional application Ser. No. 60/701,203 filed 21 Jul. 2005.

Please incorporate by reference all information in said provisional application into this instant application.

BACKGROUND OF THE INVENTION

1. Field of the Invention

The present invention relates generally to carts and, more specifically, to a hand operated conveyance for a golf bag comprising mating halves of a carrier having wheels on one portion of the carrier and a leg on the other portion with a tongue and slot platform positioned therebetween and a strap for securing the halves in an operative state.

In operation, the mating halves of the carrier are slidably engaged forming a platform for a golf bag that is placed thereon whereupon an adjustable strap peripherally positioned on the carrier and held to each halve by threading through an eyelet and the strap having a clasp which is secured thereby releasably securing the carrier to the base of the golf bag.

The golf bag is positioned such that the bag carrying strap and/or handle are on the same side as the slot side with wheels. Furthermore, the interlocking pieces using a tongue and slot mating also have rails and tracks formed in the mating pieces for added stability.

2. Description of the Prior Art

There are other cart devices designed for golf bags. Typical of these is U.S. Pat. No. 5,924,709 issued to Yang on Jul. 20, 1999.

Another patent was issued to Kim on Apr. 18, 2000 as U.S. Pat. No. 6,050,592. Yet another U.S. Pat. No. 6,056,301 was issued to Berliner, et al. on May 2, 2000 and still yet another was issued on May 30, 2000 to Kim as U.S. Pat. No. 6,068,270.

Another patent was issued to Lustica on May 30, 2000 as U.S. Pat. No. 6,068,271. Yet another U.S. Pat. No. 6,079,718 was issued to Liao on Jun. 27, 2000. Another was issued to Barten on Feb. 13, 2001 as U.S. Pat. No. 6,186,520 and still yet another was issued on Dec. 9, 2003 to Jung as U.S. Pat. No. 6,659,477.

Another patent was issued to Ortega on Jun. 22, 2004 as U.S. Design Pat. No. D491,726. Yet another U.S. Pat. No. 6,802,515 was issued to Sorenson, et al. on Oct. 12, 2004. Another was issued to Su on Oct. 26, 2004 as U.S. Pat. No. 6,808,186.

U.S. Pat. No. 5,924,709

Inventor: Fu-Hsiung Yang

Issued: Jul. 20, 1999

A golf bag includes a bag body and a base disk mounted onto the bottom of the bag body. The base disk is provided with two wheel seats each receiving a wheel and at least one leg, whereby the golf bag can be stably placed on the ground to be in a standing condition. If required, a handle can be provided at the upper end of the bag body, on a side above the wheels such that the golf bag can be slanted and moved when users grasp the upper end of the bag body or pull the handle in order to move the wheels.

U.S. Pat. No. 6,050,592

Inventor: Hyung Ho Kim

Issued: Apr. 18, 2000

A combined golf bag and collapsible golf cart (10) comprising a golf bag assembly (12) for holding various golf clubs and supplies. A golf cart assembly (14) is permanently built into the golf bag assembly (12). A structure (16) is for moving the golf cart assembly (14) from a retracted position in which the golf cart assembly (14) nests against the golf bag assembly (12) to an extended position away from the golf bag assembly (12), so that the golf bag assembly (12) can be transported by the golf cart assembly (14) along the ground.

U.S. Pat. No. 6,056,301

Inventor: Michael Berliner, et al.

Issued: May 2, 2000

A golf bag having retractable wheels and handle including a golf bag having a peripheral shell extending downwardly therefrom. The peripheral shell has an open lower end. A pair of wheels are retractably disposed within the peripheral shell of the golf bag in a closed orientation. A handle portion is provided having a T-shaped configuration defined by a lower vertical segment and an upper horizontal segment. The lower vertical segment is coupled with respect to the pair of wheels. A spring-locking mechanism selectively locks the handle portion with respect to the pair of wheels.

U.S. Pat. No. 6,068,270

Inventor: Jung Han Kim

Issued: May 30, 2000

A cart for carrying a golf bag is disclosed, comprising, one or two brackets 100 installed in a golf bag 1; a pair of insertion plates 200 detachably installed in the bracket(s) 100; a pair of bearing parts 300 installed in each of the insertion plates 200, each of the bearing parts 300 having a first bearing 310 and two second bearings 320, the second bearings 320 being located in both sides of the first bearing 310 at suitable intervals (T) and each having at least two keeping grooves 323 in the circumference of shaft holes 322 in the inside surfaces 321 thereof, two pairs of shafts 400 each having at least one keeping protrusion 411 which is selectively inserted in the keeping grooves 323 to limit the rotation of the shafts 400 selectively, each of the shafts 400 being rotatably supported between the first bearing 310 and each of the second bearings 320; and a pair of leg parts 500 each having a wheel 510 and at least one V-shaped leg 520 whose branched upper ends are pivotally connected to each of the shafts 400 and whose lower ends are connected to the wheels 510.

U.S. Pat. No. 6,068,271

Inventor: William Joseph Lustica

Issued: May 30, 2000

In a golf bag of the type having a generally tubular body, open at one end and including a rigid base portion enclosing the other end, an improved device is provided which includes a bore extending transversely through the rigid base portion, a divider portion adapted to substantially close the open end and including a plurality of holes which are adapted to receive for storage therein a shaft portion of a golf club, an axle adapted for insertion through the bore, a pair of wheels, each of which is removably attached to the axle on opposite ends of the bore, and a handle portion removably attached to the golf bag, proximate to the divider portion, for pulling the wheeled golf bag along the ground.

U.S. Pat. No. 6,079,718

Inventor: Gordon Liao

Issued: Jun. 27, 2000

A golf club cart collapsing device includes an upper support rod and a lower support rod pivotally connected to each other by means of a male and a female connector, two link members two upper connect rods, an intermediate connect rod, two lower connect rods, a H-shaped frame, two wheel hangers, and two wheels with a shaft combined together by means of pivotal connection. The golf club cart may be collapsed from a spread condition to a collapsed condition, forming a space between the two wheel hangers and the wheel shafts for an electric driving mechanism to be installed. When it is spread from the collapsed condition to the spread condition, it is automatically stabilized at the same time by engagement of the male and the female connector.

U.S. Pat. No. 6,186,520

Inventor: Arthur V. Barten

Issued: Feb. 13, 2001

A golf bag cart (10) characterized by a hinged canister (66) having an inner wall (84) defining an inner cavity (82) and a flange (78) extending radially inward from the inner wall (84). A golf bag (88) is received into the inner cavity (82) of the canister (66) and placed on the flange (78). The canister (66) is supported by a disassemblable or collapsible frame (12) on which is removably journaled on wheels (18) that allows the frame (12) to be moved when the wheels (19) roll. When a user wishes to have the golf bag cart (10) take up less room, the user can place the wheel (18) within the remaining space in the inner cavity (82) of the canister (66), and place the disassembled frame (12) into the golf bag (88).

U.S. Pat. No. 6,659,477

Inventor: Man Young Jung

Issued: Dec. 9, 2003

A semi rigid golf bag having a hollow cylindrical main section, a plurality of storage compartments for golf equipment. The main section is formed from two semicircular half sections having semi-rigid walls attached by hinges to allow a user to open the main section to access the storage compartments. There are two insertion slots formed in the cylindrical main section, an insertion slot capable of retaining a cylindrical insertion bar when the insertion bar is inserted into the insertion slot; two wheel assemblies, each wheel assembly having a wheel attached to metal tube, the tube having an open end capable of receiving the insertion bar; an. outside circle and an inside circle defined concentrically on said top end of cylindrical main section. The circles define a golf club storage area and a second storage area for golf ball and glove storage.

U.S. Pat. No. D491,726

Inventor: Charles M. Ortega

Issued: Jun. 22, 2004

The invention is an ornamental design of a handle and wheels for a golf bag as shown in the patent drawing figures.

U.S. Pat. No. 6,802,515

Inventor: Lloyd R. Sorenson, et al.

Issued: Oct. 12, 2004

An actuator for a golf bag has a handle and at least one wheel movable between first and second positions. The actuator comprises a frame, a first link engaged with the handle and engaged with the frame, and a second link. The second link is engaged with the at least one wheel, engaged with the frame, and engaged with the first link. The first and second links are movable to move the wheels between the first and second positions.

U.S. Pat. No. 6,808,186

Inventor: Po-Tang Su

Issued: Oct. 26, 2004

A wheel structure is constructed to include a wheel bracket connectable to the bottom cuff of a golf bag, a wheel axle inserted through axle holes of the wheel bracket, two wheels, two connectors respectively mounted in the center axle holes of the wheels and capped on the ends of the wheel axle, and two clamps respectively mounted in spacer blocks in the connector to secure the ends of the wheel axle to the connectors.

While these articles of conveyance for a golf bag may be suitable for the purposes for which they were designed, they would not be as suitable for the purposes of the present invention, as hereinafter described.

SUMMARY OF THE PRESENT INVENTION

The Drag-a-Bag is a wheeled unit created to easily support a bag of golf clubs and supplies, enabling the user to roll the bag to a destination. By pulling the bag handle or strap while the bag rests on this product, one can transport golf clubs without expending extra energy. This device will provide a great convenience to those with physical limitations or others needing or preferring assistance in carrying a golf bag.

Although many enjoy playing golf, some are not so enthusiastic when it comes to carrying a bag full of clubs. It is often uncomfortable and can be difficult to carry a full golf bag from the home to a car or from the car to the golf course. Golf bags are heavy and awkward; lugging these bags can cause some discomfort. Golfers will revel in an easier way to transport a golf bag with the new design of Drag-a-Bag.

The Drag-a-Bag product enables a golfer to roll his or her golf bag from place to place instead of carrying it to and from the golf course. The entire unit consists of two interlocking pieces, one with wheels, and a strap. The golf conveyance comprises mating halves of a carrier having wheels on one portion of the carrier and a leg on the other portion with a tongue and slot platform positioned therebetween and a strap for securing the halves in an engaged state.

In operation, the mating halves of the carrier are slidably engaged forming a platform for a golf bag that is placed thereon whereupon an adjustable strap peripherally positioned on the carrier and held to each halve by threading through an eyelet and the strap having a clasp which is secured thereby releasably securing the carrier to the base of the golf bag.

The interlocking pieces using a tongue and slot have rails and tracks formed in opposing pieces for added stability. The base platform is preferably seven inches long by two and a half inches wide to pass between the nubs on the bottom of some golf bags. The slide platform will be preferably seven inches long to allow adjustment for bags eight to ten inches across, while maintaining the strength of overlap of four to six inches. The back end of both pieces is preferably raised approximately three inches and contains an outside slot to accommodate a strap. Once it is threaded through the two pieces, the use of the strap (including plastic quick release closure) is twofold. When the slide is inserted into the base, the strap will hold the slide in place and hold the entire assembly to the base of the golf bag. Release of the strap closure will quickly release the unit from the bag which can be then loaded onto a power cart at the golf course while the carrier can be stowed on the power cart for use during the return home. With the exception of the strap and wheel assemblies, the unit can be made of molded plastic or aluminum.

A primary object of the present invention is to provide a carrier for a golf bag.

Another object of the present invention is to provide a carrier comprising mating halves that when mated form a carrier for a golf bag.

Yet another object of the present invention is to provide a carrier wherein one of the mating members has a pair of wheels while the other mating member has a leg.

Still yet another object of the present invention is to provide a carrier using a tongue and slot as the mating means.

Another object of the present invention is to provide a carrier wherein the tongue and slot each have a respective part of rails and tracks formed within the mating members.

Yet another object of the present invention is to provide a carrier having a wall depending from the outside end of each mating member with an eyelet for supporting a strap therethrough.

Still yet another object of the present invention is to provide a carrier with a strap that once assembled can be releasably fastened to the base of a golf bag.

Another object of the present invention is to provide a carrier with two opposing wheels positioned toward the rear of the slot side and spaced ½–¾ inch from the opposing sides of the carrier.

Additional objects of the present invention will appear as the description proceeds.

The present invention overcomes the shortcomings of the prior art by providing a hand operated conveyance for a golf bag comprising mating halves of a carrier having wheels on one portion of the carrier and a leg on the other portion with a tongue and slot platform positioned therebetween and a strap for securing the halves in an operative state. The mating halves of the carrier are slidably engaged forming a platform for a golf bag that is placed thereon whereupon an adjustable strap peripherally positioned on the carrier and held to each halve by threading through an eyelet and the strap having a clasp which is secured thereby releasably securing the carrier to the base of the golf bag. The interlocking pieces using a tongue and slot mating also have rails and tracks formed in the mating pieces for added stability.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
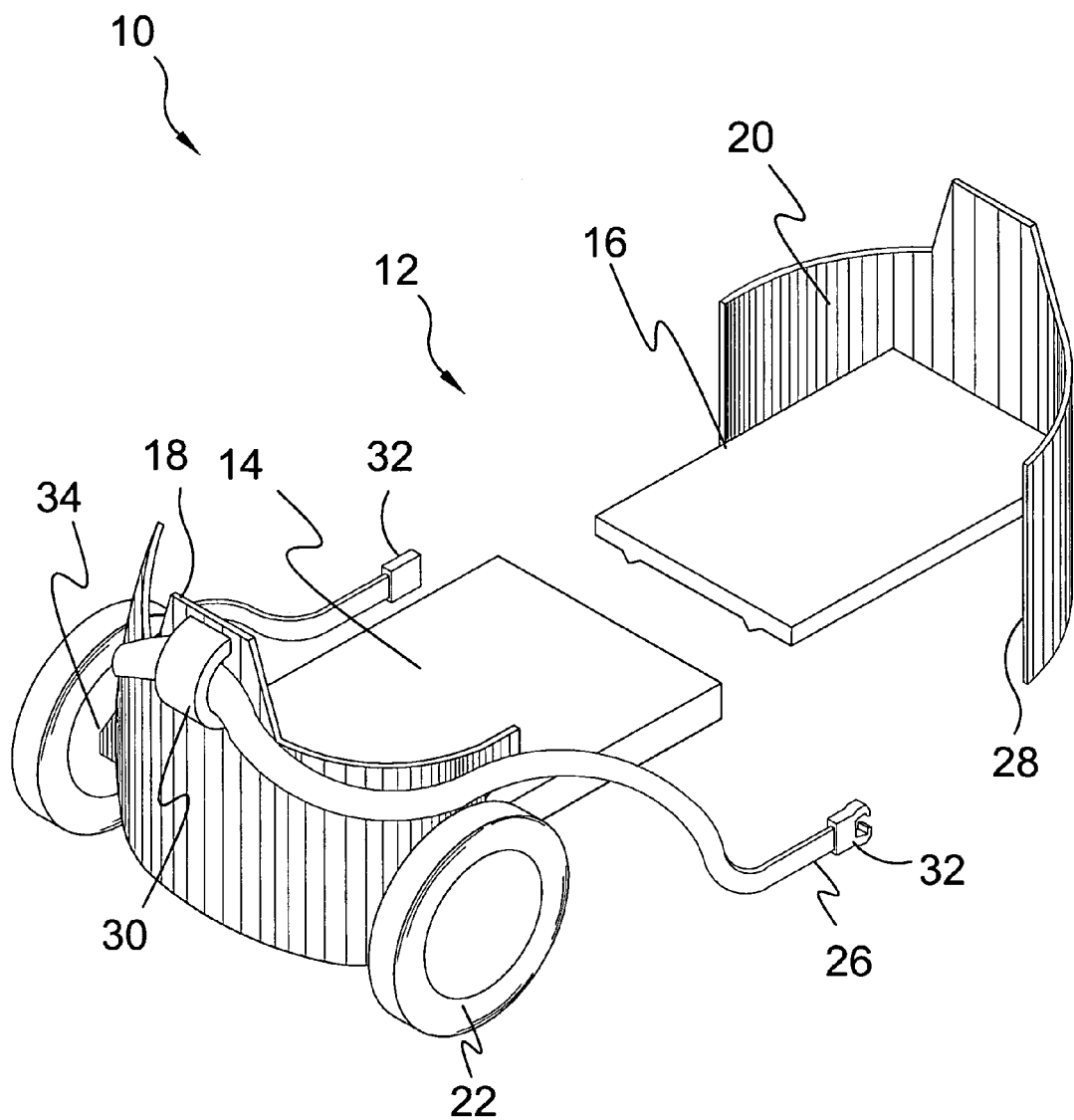
FIG. 1 is a perspective view of the present invention.

Turning now descriptively to the drawings, in which similar reference characters denote similar elements throughout the several views, the figures illustrate the Golf Bag Carrier of the present invention. With regard to the reference numerals used, the following numbering is used throughout the various drawing figures.

10 Golf Bag Carrier of the present invention
12 wheeled platform assembly
14 slotted platform section
16 tongue platform section
18 carrier wall of 14
20 carrier wall of 16
22 wheel
24 axle
26 strap
28 leg member
30 strap support eyelet
32 strap buckle
34 wheel spacer 36 rails of 16
38 tracks of 14
40 slot
42 tongue
44 golf bag
46 base 44
48 handle of 44

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is a perspective view of the hand operated golf bag carrier present invention 10. The present invention is a wheeled platform assembly 12 comprising mating sections having wheels 22 with spacers 34 on a slotted platform 14 and a leg 28 on the mating tongue platform 16 with a strap member 26 for securing the two sections in an engaged state. In operation, the tongue platform 16 is introduced into the slotted platform 14 and a golf bag is placed thereon and sandwiched between the vertically depending wall 18 of the slotted platform 14 and the opposing, vertically depending wall 20 of the tongued platform 16. An adjustable strap 26 is peripherally positioned on the wheeled platform 12 and held to each section by threading through a strap support eyelet 30 and the strap 26 includes a quick release buckle 32 which is secured thereby releasably securing to the base of the golf bag.

Figure 2:
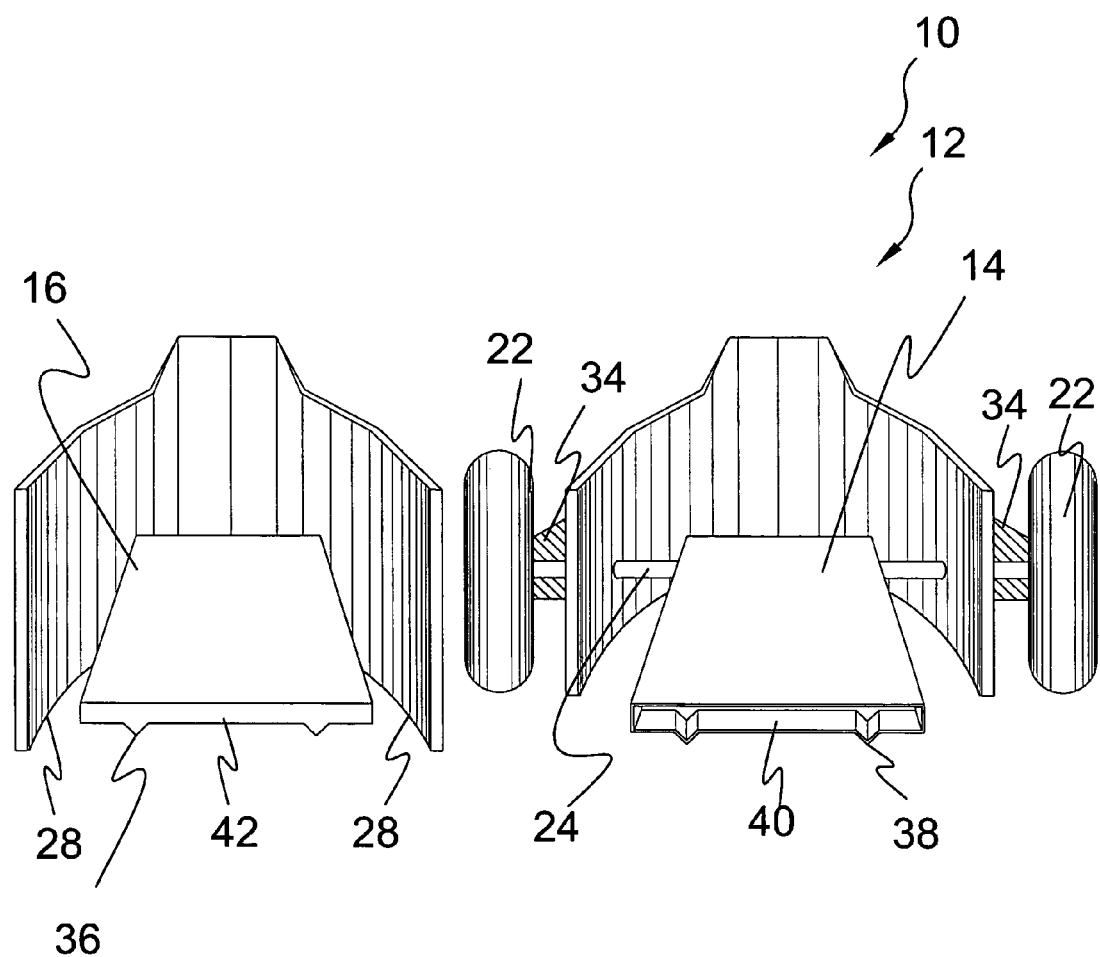
FIG. 2 is a perspective view of the present invention.

FIG. 2 is a perspective view of the present invention 10. Shown is the wheel platform assembly 12 comprising mating sections having wheels 22 with spacers 34 on the axle 24 of the slotted platform 14 and a leg 28 on the mating tongue platform 16 with a strap member 26, shown in FIG. 1, for securing the two sections in an engaged state. The tongue portion 42 of the tongue platform 16 includes rails 36 that run along tracks 38 formed within the slot 40 of the slotted section 14 for added stability once inserted therein.

Figure 3:
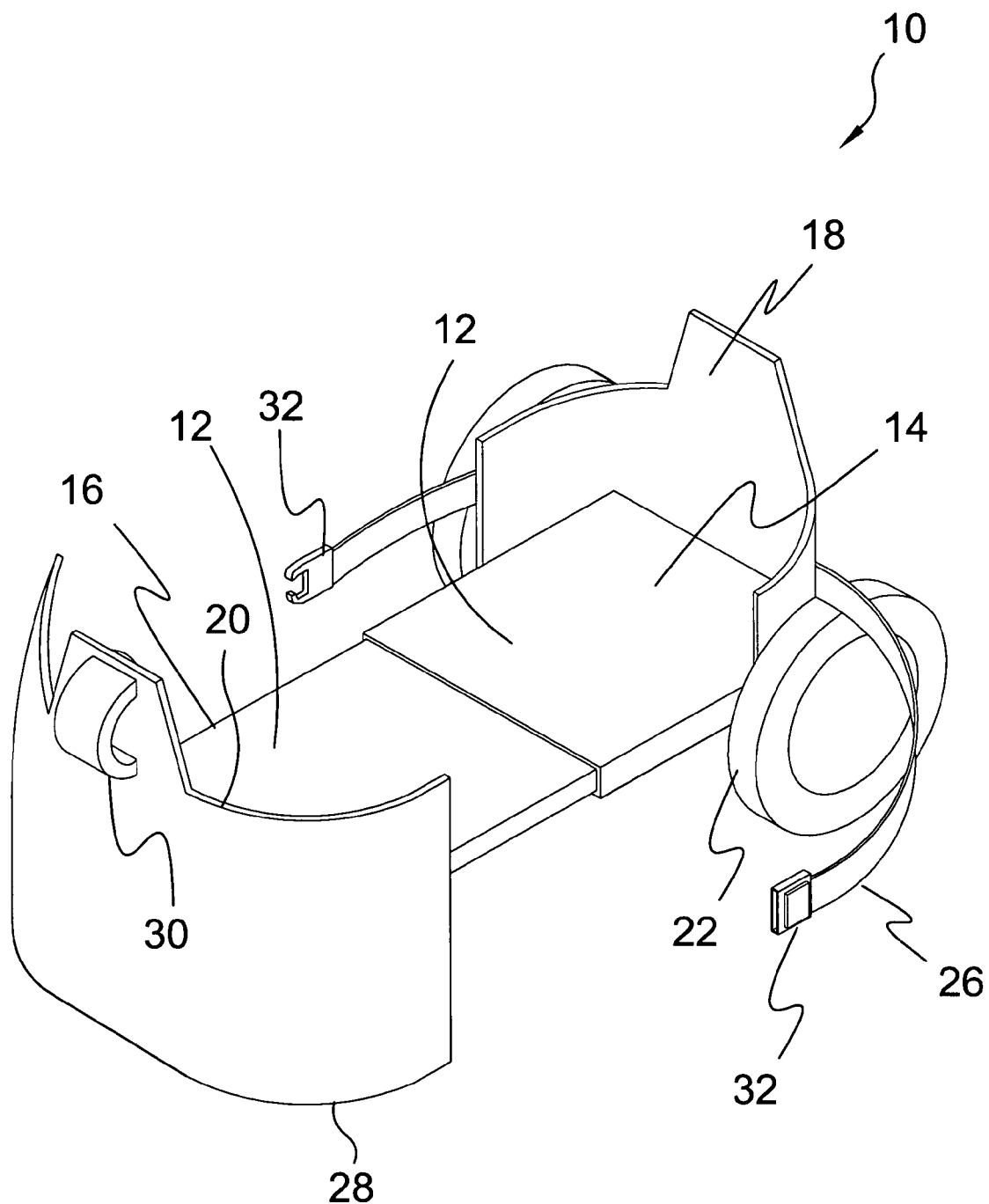
FIG. 3 is an assembled perspective view of the present invention.

FIG. 3 is an assembled perspective view of the golf bag carrier of the present invention 10. Shown is the present invention 10 having two interlocking pieces forming a wheeled platform assembly 12, a tongue platform 16 which includes a leg 28 and a strap 26 that includes a quick release buckle 32 for releasably securing the respective carrier walls 18, 20 to the base of a golf bag and which slides into the wheeled 22 slotted platform 14. A strap support eyelet 30 is externally disposed on the carrier wall 20 of the tongue platform 16.

Figure 4:
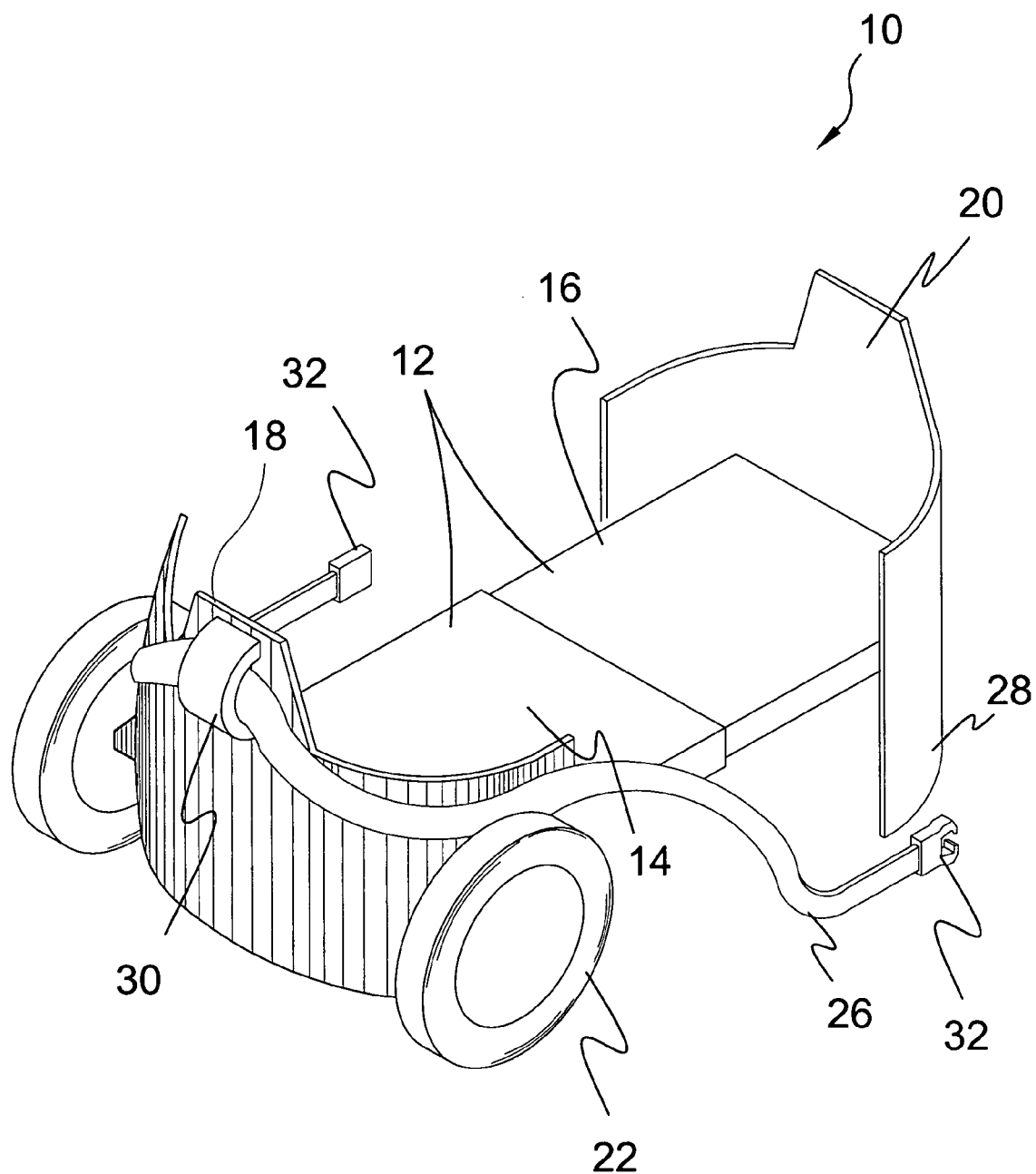
FIG. 4 is an assembled perspective view of the present invention.

FIG. 4 is an assembled perspective view of the golf bag carrier of the present invention 10. Shown is the present invention 10 having two interlocking pieces forming a wheeled platform assembly 12, a wheeled 22 tongue platform 16 which includes a leg 28 and which slides into the slotted platform 14 and which also includes a strap 26 that includes a quick release buckle 32 for releasably securing the respective carrier walls 18,20 to the base of a golf bag. A strap support eyelet 30 is externally disposed on the carrier wall 18 of the slotted platform 14 and the strap 26 is passed therethrough.

Figure 5:
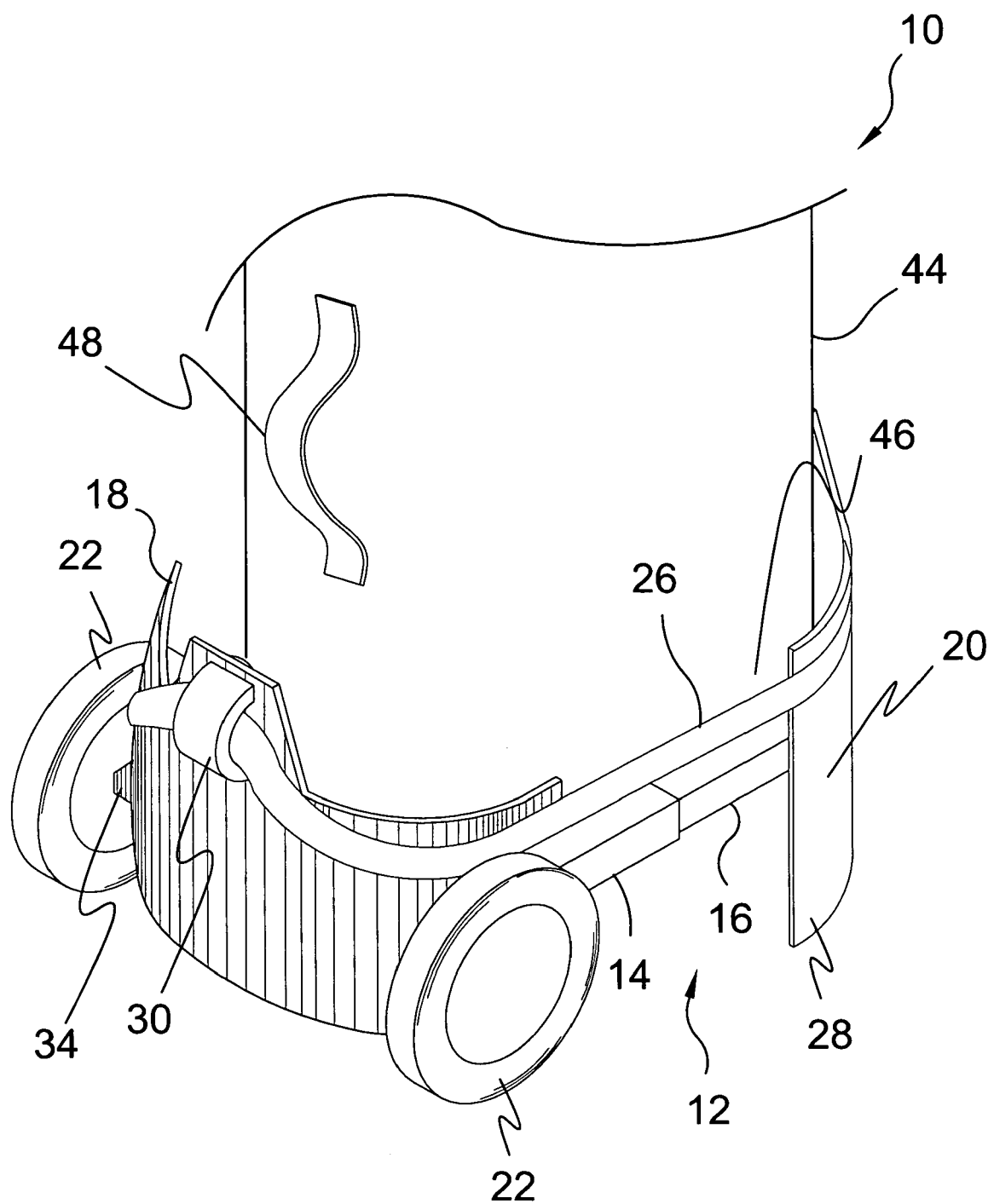
FIG. 5 is a perspective view of the present invention with golf bag thereon.

FIG. 5 is a perspective view of the present invention 10 with the base 46 of a golf bag 44 thereon. The present invention 10 is a hand operated conveyance for a golf bag 44 that enables a golfer to roll his or her golf bag 44 from place to place instead of carrying it to or from the golf course. The golf conveyance comprises mating platform sections of a carrier having wheels 22 with wheel spacers 34 and an interior slot on the slotted platform 14 and a leg 28 and a tongue on the tongue platform 16. In operation, the tongue is inserted into the slot and both platform sections 14,16 are slidably engaged forming a platform assembly 12 for a golf bag 44 that is placed thereon whereupon an adjustable strap 26 is peripherally positioned on the carriers 18,20 and held to each section by threading through an eyelet 30 and the strap 26 having a clasp which is secured thereby releasably securing the golf bag carrier 10 to the base 46 of the golf bag 44. The interlocking pieces using a tongue and slot have rails and tracks formed in opposing pieces for added stability. The golf bag 44 is positioned such that the bag handle 48 or carrying strap is facing the slot side with wheels 22.

Figure 6:
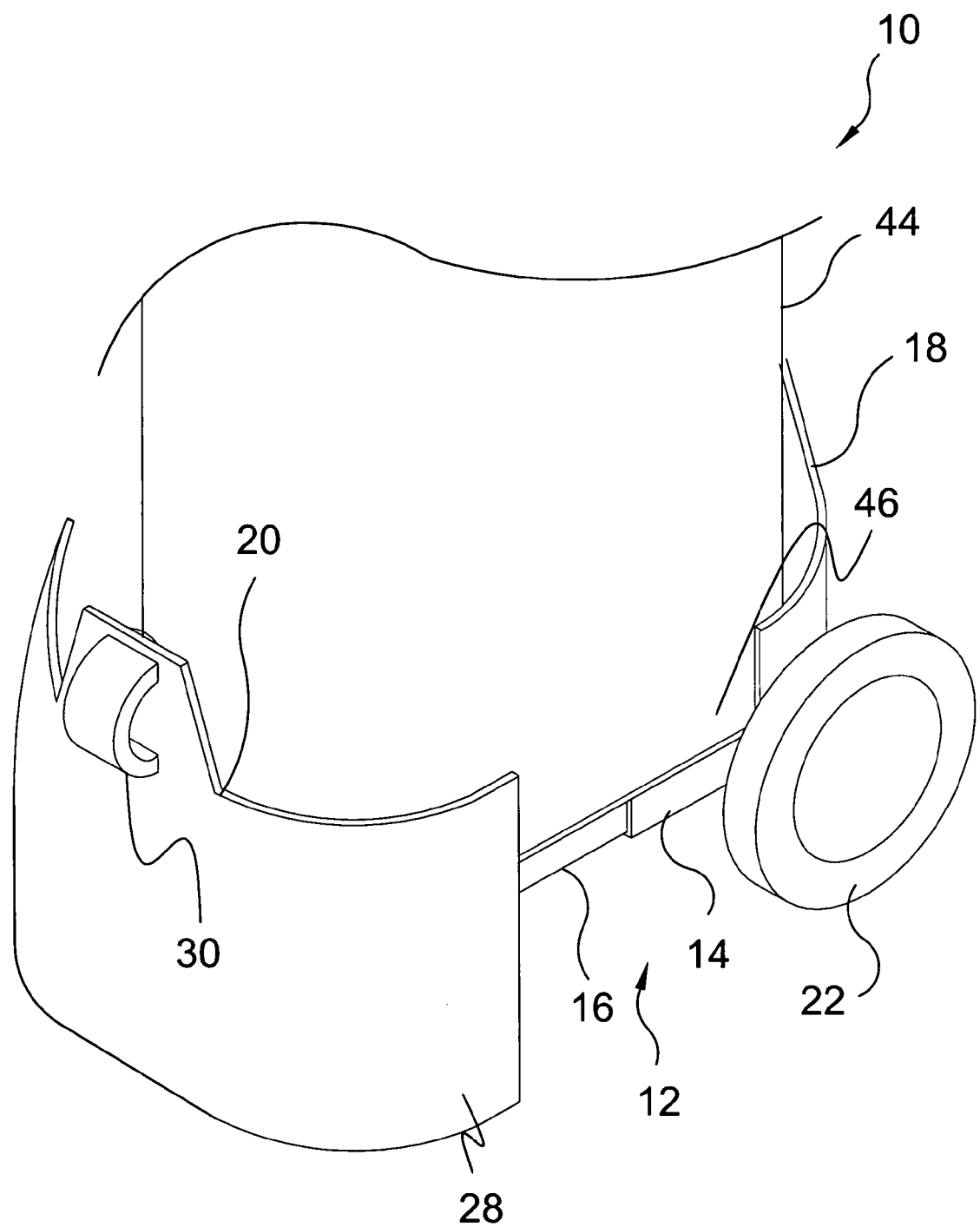
FIG. 6 is a perspective view of the present invention with golf bag thereon.

FIG. 6 is a perspective view of the present invention 10 with the base 46 of a golf bag 44 thereon. The present invention 10 is a hand operated conveyance for a golf bag 44 that enables a golfer to roll his or her golf bag 44 from place to place instead of carrying it to or from the golf course. The golf conveyance comprises mating platform sections of a carrier having wheels 22 and an interior slot on the slotted platform 14 and a leg 28 and a tongue on the tongue platform 16. In operation, the tongue is inserted into the slot and both platform sections 14,16 are slidably engaged forming a platform assembly 12 for a golf bag 44 that is placed thereon whereupon an adjustable strap 26 is peripherally positioned on the carriers 18,20 and held to each section by threading through an eyelet 30 and the strap 26 having a clasp which is secured thereby releasably securing the golf bag carrier 10 to the base 46 of the golf bag 44. The interlocking pieces using a tongue and slot have rails and tracks formed in opposing pieces for added stability.

Figure 7:
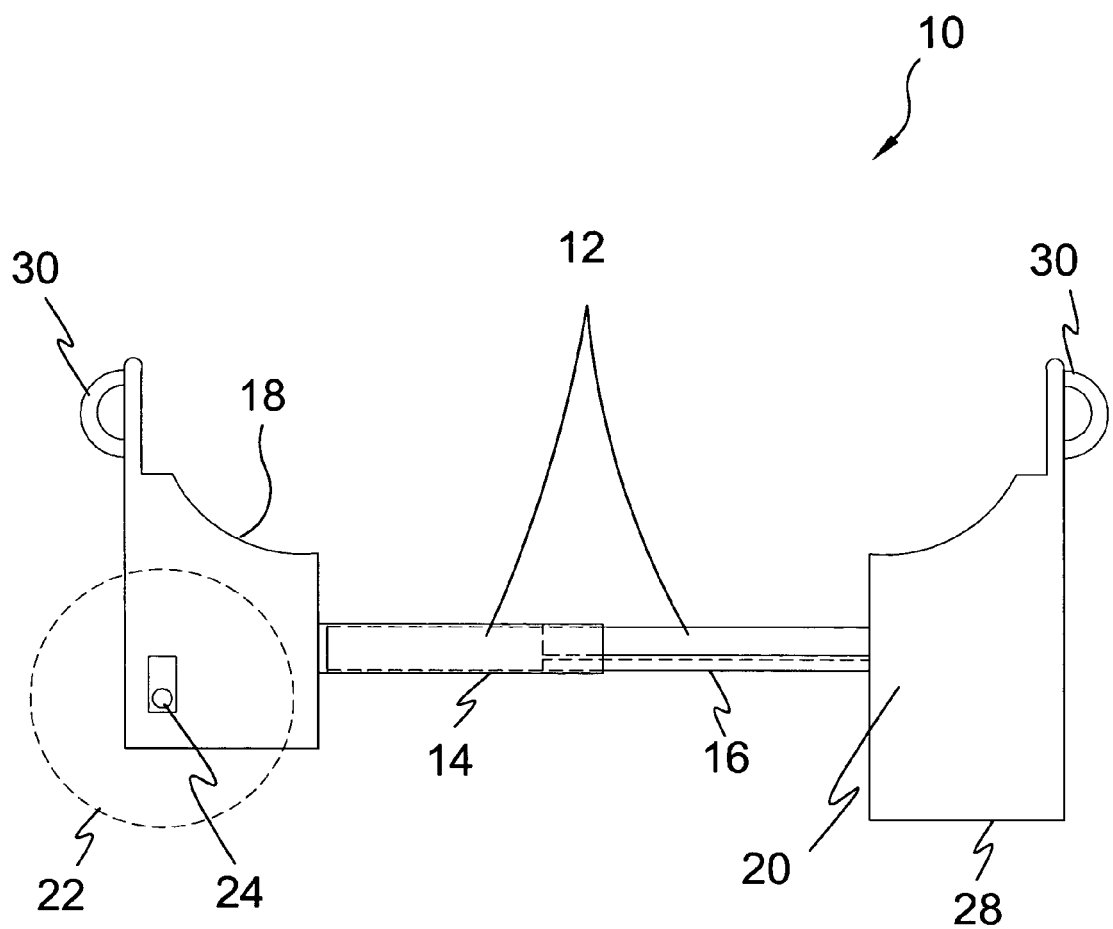
FIG. 7 is a side view of the present invention.

FIG. 7 is a side view of the present invention 10. The present invention 10 is a hand operated conveyance for a golf bag that enables a golfer to roll his or her golf bag from place to place instead of carrying it to or from the golf course. The golf conveyance comprises mating platform sections of a carrier having wheels 22 with spacers 34 shown in FIG. 2 and an interior slot on the slotted platform 14 and a leg 28 and a tongue on the tongue platform 16. In operation, the tongue is inserted into the slot and both platform sections 14,16 are slidably engaged forming a platform assembly 12 for a golf bag 44 shown in FIG. 5 that is placed thereon whereupon an adjustable strap 26 shown in FIG. 1 is peripherally positioned on the carriers 18,20 and held to each section by threading through an eyelet 30 and the strap 26 having a clasp 32 shown in FIG. 1 which is secured thereby releasably securing the golf bag carrier 10 to the base of the golf bag 44. The interlocking pieces using a tongue and slot have rails and tracks formed in opposing pieces for added stability. The wheels 22 rotate around an axle 24.

Figure 8:
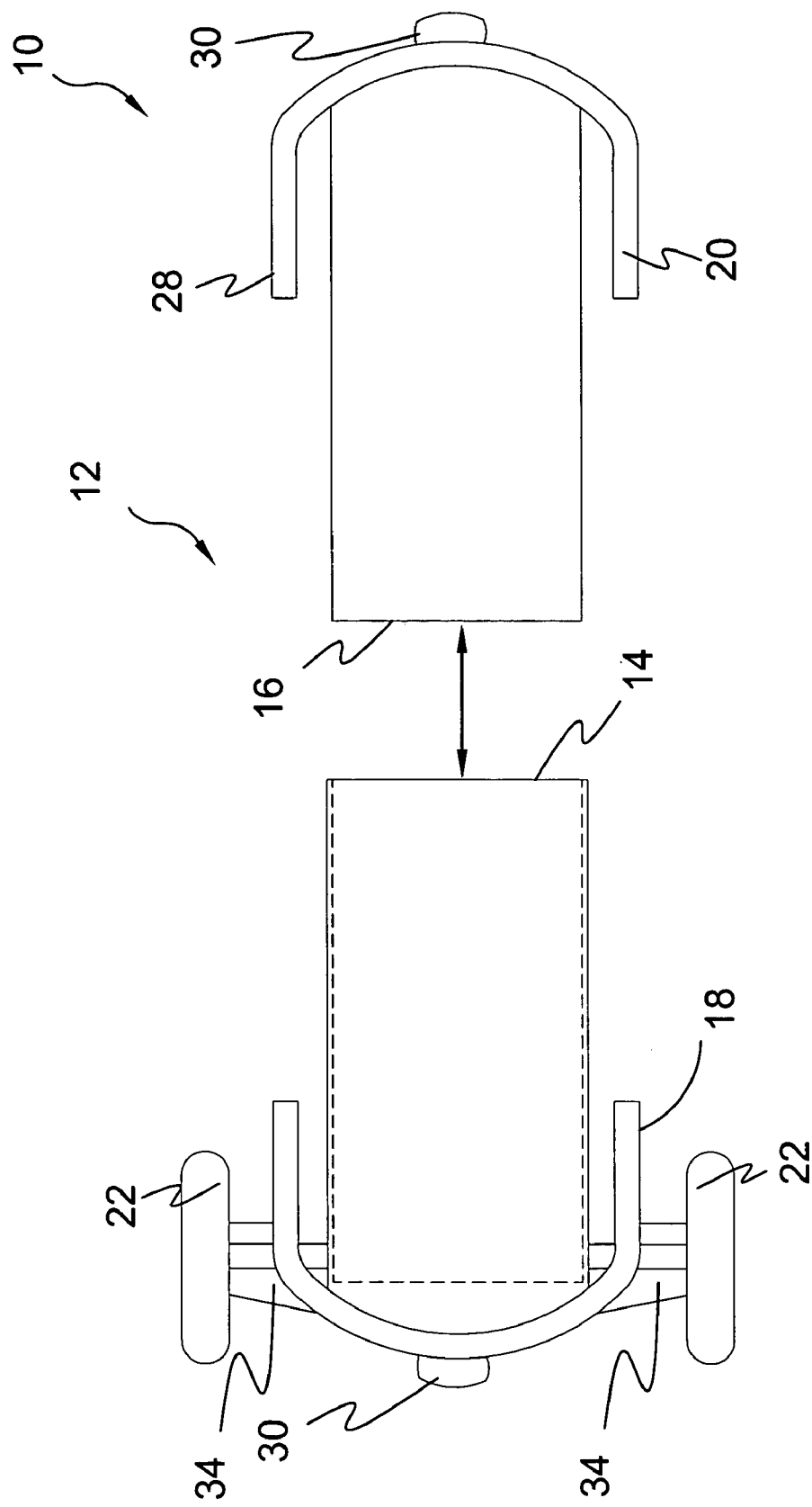
FIG. 8 is a top view of the present invention.

FIG. 8 is a top view of the present invention 10. The present invention 10 is a hand operated conveyance for a golf bag that enables a golfer to roll his or her golf bag from place to place instead of carrying it to or from the golf course. The golf conveyance comprises mating platform sections of a carrier having wheels 22 with spacers 34 and an interior slot on the slotted platform 14 and a leg 28 and a tongue on the tongue platform 16. In operation, the tongue is inserted into the slot and both platform sections 14,16 are slidably engaged forming a platform assembly 12 for a golf bag 44 shown in FIG. 5 that is placed thereon whereupon an adjustable strap 26 shown in FIG. 1 is peripherally positioned on the carriers 18,20 and held to each section by threading through an eyelet 30 and the strap 26 having a clasp 32 shown in FIG. 1 which is secured thereby releasably securing the golf bag carrier 10 to the base of the golf bag 44. The interlocking pieces using a tongue and slot have rails and tracks formed in opposing pieces for added stability.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A golf bag carrying device comprising:
a) a two-piece interlocking platform assembly;
b) interlocking means for said platform assembly; and
c) means for securing and retaining a golf bag on said platform assembly;
wherein said platform assembly comprises:
d) a slotted platform having a receiving means; and
e) a mating tongue platform;
wherein said slotted platform is substantially hollow with said receiving means oriented towards the tongue platform:
wherein the tongue of said tongue platform is sized accordingly to fit into said slot;
wherein said tongue slides within said slot to extend and retract the length of said platform assembly accordingly;
wherein said tongue platform has a multisided vertical carrier wall disposed on the distal end thereof with the medially oriented portion open to accept a golf bag;
wherein said slotted platform has a multisided vertical carrier wall disposed on the distal end thereof with the medially oriented portion open to accept a golf bag;
wherein each said carrier wall further includes at least one strap support eyelet exteriorly disposed thereon;
further including a strap that serves to clamp the two opposing carrier walls against the base of the golf bag to secure and retain it therein;
wherein said strap passes through said strap support eyelets to maintain it in a pre-determined horizontal plane when secured;
wherein said strap further includes an adjustable strap buckle thereby enabling the user to adjust and secure said platform assembly to accommodate various sized golf bags;
wherein said wheeled platform assembly includes a pair of wheels disposed on one platform section and a leg member on the opposing platform section;
wherein said wheels are disposed on said slotted platform and said leg member is disposed on said tongue platform;
wherein said golf bag is installed with its handle disposed oriented towards said wheels;
wherein the user moves said wheeled platform assembly and the associated golf bag by pulling on the golf bag handle/strap to raise said leg to transfer the weight to said wheels and pulling it to the desired location;
whereupon reaching the desired location the user tilts said golf bag back to a substantially vertical position until resting on said leg until ready to move again;
wherein said wheels rotate on an axle extending from said carrier wall of said slotted platform;
wherein said axle further includes interiorly disposed wheel spacers to provide a wider wheel base for additional stability; and
wherein said tongue platform includes at least one rail member and said slot includes an interiorly disposed mating track for each said rail member.

* * * * *